United States Patent
Lewis et al.

(10) Patent No.: US 6,947,531 B1
(45) Date of Patent: Sep. 20, 2005

(54) SYSTEM AND METHOD FOR ADVERTISING SUPPORTED COMMUNICATIONS

(75) Inventors: Ronald Lewis, Independence, MO (US); Charles Woodson, Peculiar, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 175 days.

(21) Appl. No.: 10/033,289

(22) Filed: Dec. 27, 2001

(51) Int. Cl.$^7$ .......................................... H04M 15/00
(52) U.S. Cl. ................................. 379/114.13; 705/14
(58) Field of Search ................... 379/114.01, 114.13, 379/114.17, 121.02; 705/14, 1

(56) References Cited

U.S. PATENT DOCUMENTS

| 4,850,007 A | * | 7/1989 | Marino et al. ......... | 379/114.13 |
| 5,987,424 A | * | 11/1999 | Nakamura ................... | 705/14 |

OTHER PUBLICATIONS

"The Voice Portal", http://www.pcmag.com/article/0,2997,s%253D1490%2526a%253D3840,00.asp Sep. 21, 2001, pp. 1-3.

"SmartTone and Spotcast Jointly Introduce Innovative 'Ad to U' Service for EXTRA's Customers," http://www.smartone.com.hk/press/feb1700.html, Sep. 21, 2001, pp. 1-2.

"Free Long Distance Phone Service is Here; DQE and BroadPoint Launch Breakthrough 'Free Way' Service Nationwide," http://www.dqu.com/news/pr011299.htm Sep. 21, 2001, pp. 1-3.

"TM FreeWay Make Your Calls, and Don't Pay," http://www.tmfreeway.com.my/product.shtml, Sep. 21, 2001, pp. 1-3.

* cited by examiner

*Primary Examiner*—Fan Tsang
*Assistant Examiner*—Olisa Anwah

(57) ABSTRACT

A system and method for advertising supported communications in a telecommunications network are described. One exemplary method includes receiving a call request to connect a call from an originating subscriber terminal to a destination subscriber terminal. The call request includes a destination identifier such as a MIN or a PSTN telephone number associated with the destination terminal. The method further includes providing at least one advertisement to a subscriber associated with the originating terminal, determining a free calling balance for the subscriber based on the advertisements being provided to the subscriber and the destination identifier, connecting the call from the originating terminal to the destination terminal, and monitoring as well as decrementing the free calling balance as the call progresses.

26 Claims, 8 Drawing Sheets

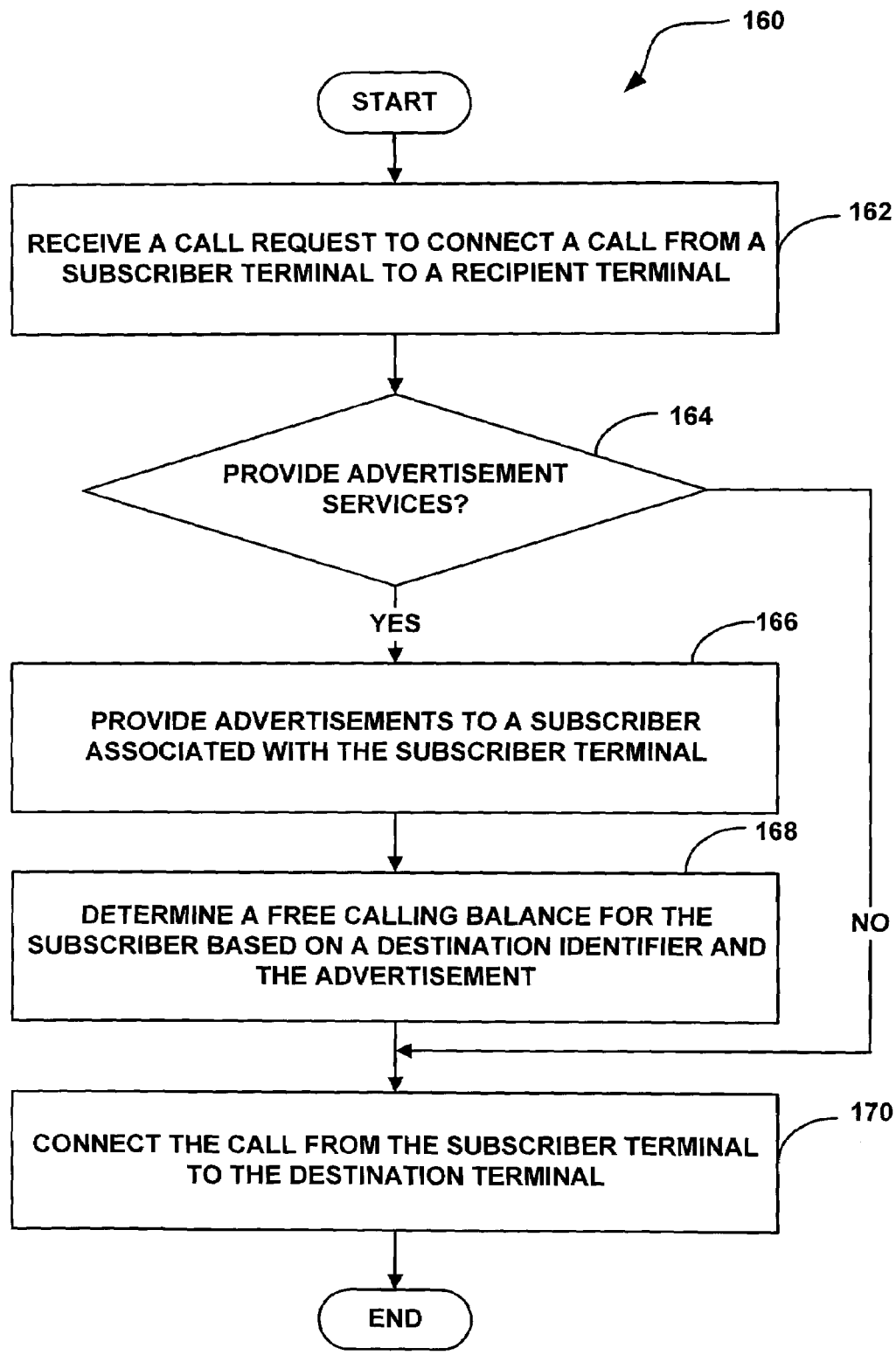

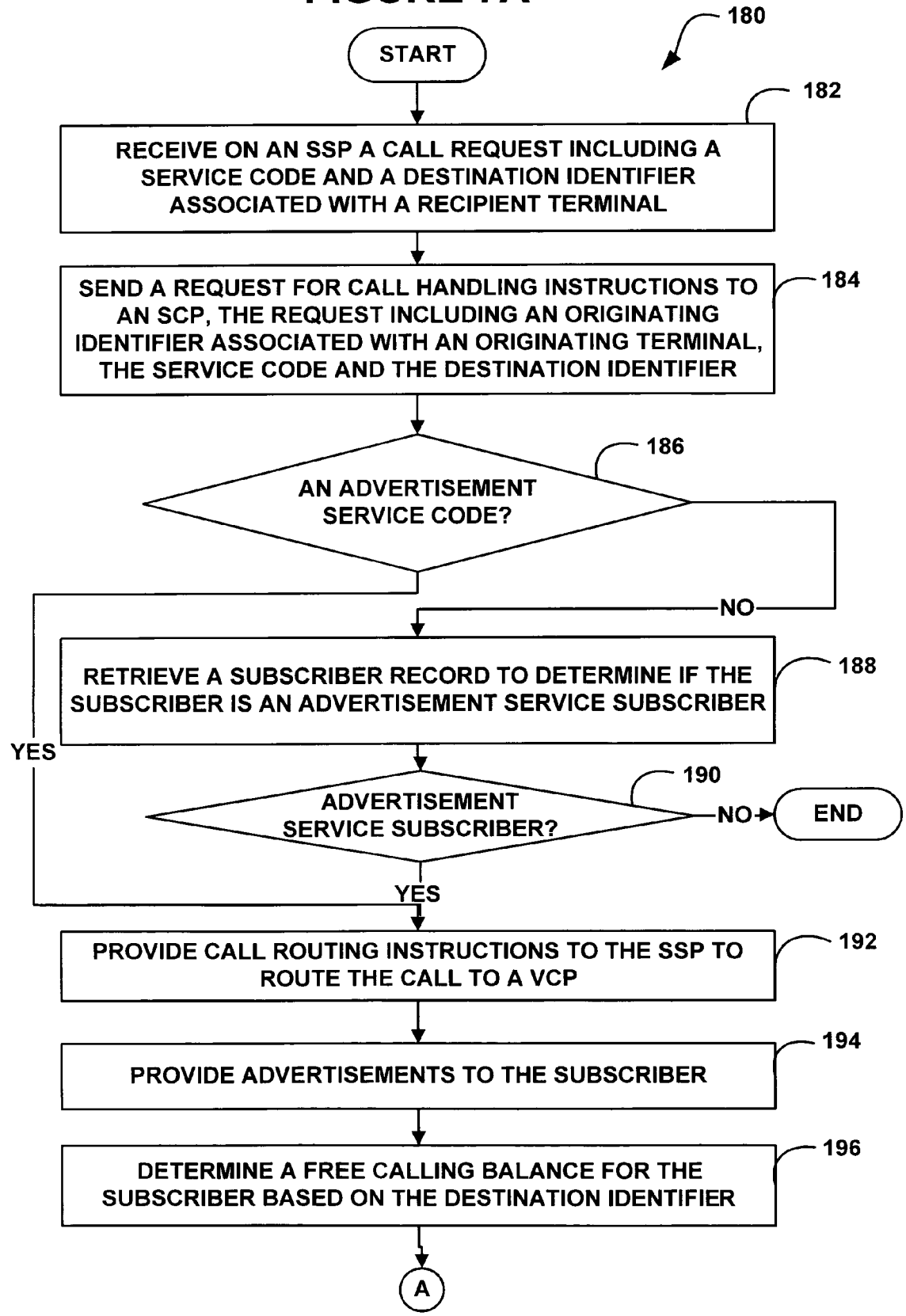

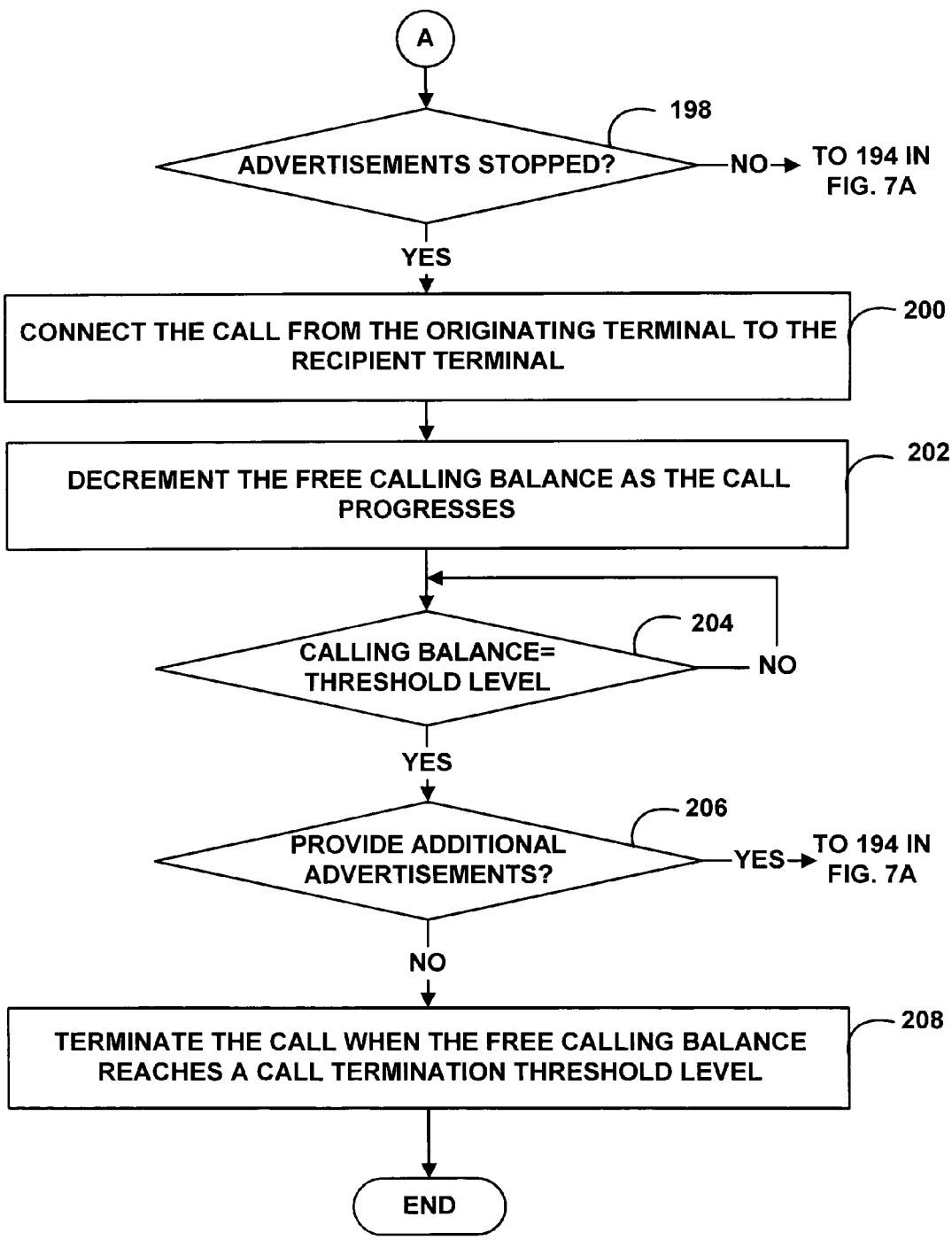

SYSTEM AND METHOD FOR ADVERTISING SUPPORTED COMMUNICATIONS

BACKGROUND

1. Field of the Invention

The present invention relates to telecommunications systems and, more particularly, to a method and system for advertising supported communications.

2. Description of Related Art

Over the last few years, wireless phones have shrunk in size and weight, making them a viable communication tool. As the amount of time subscribers spend talking on their cell phones is steadily increasing, the cost of service is becoming an important factor in how much time a person spends on a phone.

Many cell phone companies offer to their subscribers a predetermined number of free minutes per month that may be managed through the use of subscriber free account balances. In such a system, a subscriber may be authorized to use a predetermined number of minutes or a predetermined monetary value of services. As the subscriber uses the services, the carrier may then continuously monitor and decrement the free account balance. When the free account balance is exhausted, the carrier may then bill the subscriber for the excess use.

Additionally, some providers offer prepaid services to "credit challenged" subscribers, that is, subscribers with poor credit standings, or subscribers wishing to limit their monthly spending to a predetermined monthly balance. In such a system, a subscriber may deposit a prepayment amount with a service provider, and the service provider allows the subscriber to use services only up to a predetermined amount prepaid. When the subscriber approaches the prepaid limit during a call, the service provider might then prompt the subscriber to recharge the account, and the subscriber may add value to the account balance by making an additional prepayment, as for instance, with a credit card.

While the existing services enable users to obtain free minutes and control over the cost of service, a need still exists for an improved system for providing free or discounted communication services to subscribers.

SUMMARY

The present invention provides a method and system for advertising supported communications.

One exemplary method includes receiving a call request to connect a call from an originating subscriber terminal to a destination subscriber terminal. The call request may include a destination identifier, such as a MIN or a PSTN number, associated with the destination subscriber terminal. The method further includes providing at least one advertisement to a subscriber associated with the originating subscriber terminal. According to one exemplary embodiment, advertisements provided to the subscriber may include audio, video, text advertisements, or a combination thereof.

The method further includes determining a free calling balance for the subscriber based on the destination identifier specified by the subscriber and the advertisements being provided to the subscriber. In one embodiment, before providing any advertisements to the subscriber, the subscriber may be queried to specify an expected length of the call. Then, based on the specified length of the call, the subscriber may be provided a specific number or a predetermined length of the advertisements sufficient to satisfy the expected length of the call.

Once the subscriber finishes viewing and/or listening to advertisements, the call is connected from the originating subscriber terminal to the destination subscriber terminal. When the call is connected, the exemplary method further includes monitoring of the free calling balance during the progress of the call. If the free calling balance reaches a predetermined threshold level, one embodiment of the method includes notifying the subscriber associated with the originating subscriber terminal that the free calling balance reached the predetermined threshold level, and providing additional advertisement if the subscriber wishes to obtain the additional advertisement.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 6 is a flow chart illustrating a method for connecting a call for a subscriber designated to receive advertisement services according to an exemplary embodiment; and FIGS. 7A and 7B are a flow chart illustrating a method for connecting and managing a call for a subscriber designated to receive advertisement services according to an exemplary embodiment.

DETAILED DESCRIPTION OF AN EXEMPLARY EMBODIMENT

Figure 1:
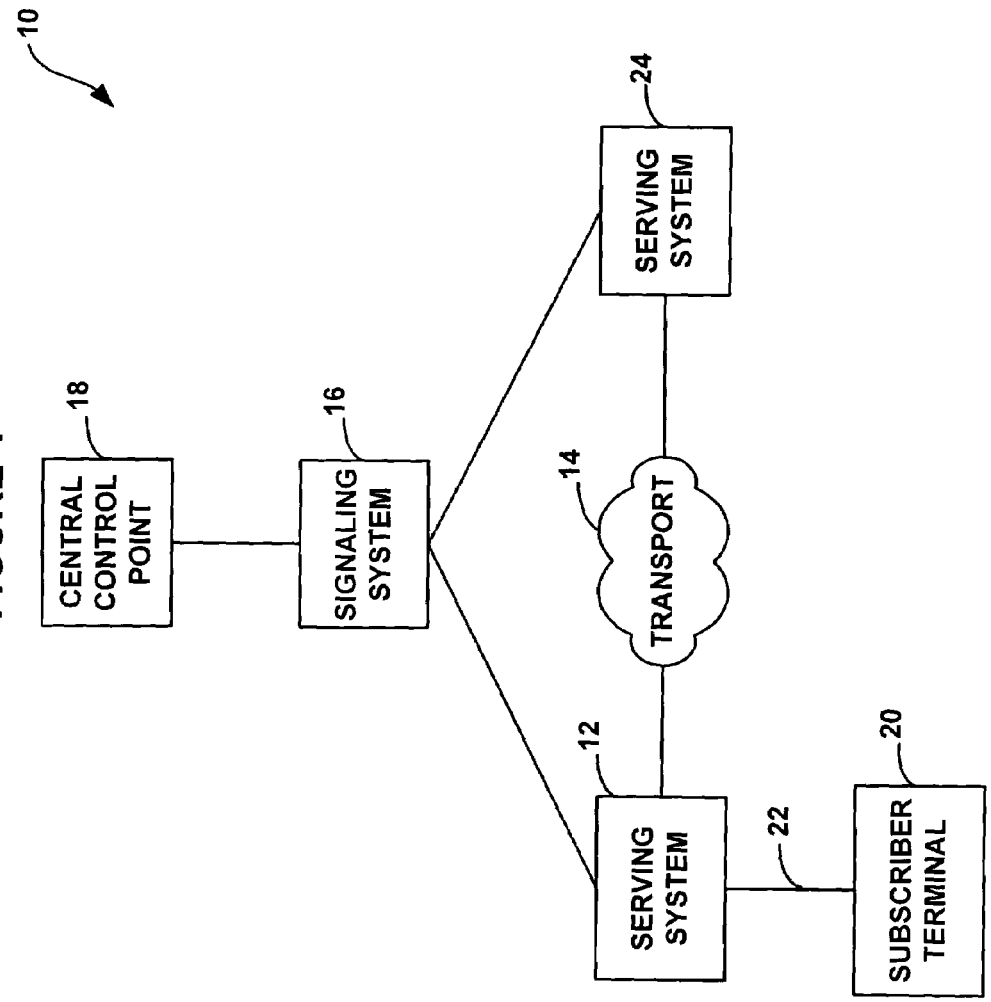
FIG. 1 is a simplified block diagram illustrating a telecommunications network including a serving system and a central control node.

Referring to the drawings, FIG. 1 illustrates a simplified block diagram of a telecommunications network 10. As shown in FIG. 1, network 10 includes a serving system 12 interconnected to (or part of) a transport network 14 and to a signaling system 16. The signaling system 16 is further interconnected to at least one central control point ("CCP") 18. Network 10 further includes a plurality of subscriber terminals, of which exemplary terminal 20 is shown. Terminal 20 may take any suitable form, such as, for instance, a telephone, a computer, or a personal digital assistant ("PDA"). Terminal 20 may then be coupled to serving system 12 by an appropriate link 22, which may comprise wireline or wireless portions.

This and other arrangements described herein are shown for purposes of illustration only, and those skilled in the art will appreciate that other arrangements and other elements (e.g., machines, interfaces, functions, etc.) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location. Still further, various functions described herein as being performed by one or more entities may be carried out by a processor executing an appropriate set of machine language instructions stored in memory. Provided with the present disclosure, those skilled in the art can readily prepare appropriate computer instructions to perform such functions.

Serving system 12 includes a set of stored logic that defines how to process calls involving one or more terminals, such as terminal 20. The stored logic may include a number of trigger points that cause the serving system to seek guidance from CCP 18 in response to various conditions. When serving system 12 encounters a trigger, the serving system may pause call processing and send a signaling message via signaling system 16 to CCP 18, carrying various parameters. For calls originating from terminal 20, the signaling message may, for instance, convey an identification of the terminal and the digit sequence dialed by the subscriber. For calls terminating to terminal 20, the signaling message may, for instance, convey an identification of the terminal and an indication of the calling party. Of course, these are only examples; the messages may convey these and/or other parameters.

CCP 18 also includes a set of stored logic. When CCP 18 receives the signaling message from serving system 12, CCP 18 will execute its stored logic so as to parse the message, identify its parameters, and responsively carry out one or more functions. For example, in response to a call-origination signaling message, CCP 18 may determine that the subscriber dialed a toll-free number (e.g., an 800, 888 or 877 number). Conventionally, the CCP's logic may then cause the CCP to reference a database in order to translate the toll-free number into an actual routing number associated with the called party. The CCP may then generate and send to serving system 12 a response message instructing serving system 12 to route the call to the actual routing number. In turn, serving system 12 would then set up and connect the call over transport network 14 to that routing number.

Figure 2:
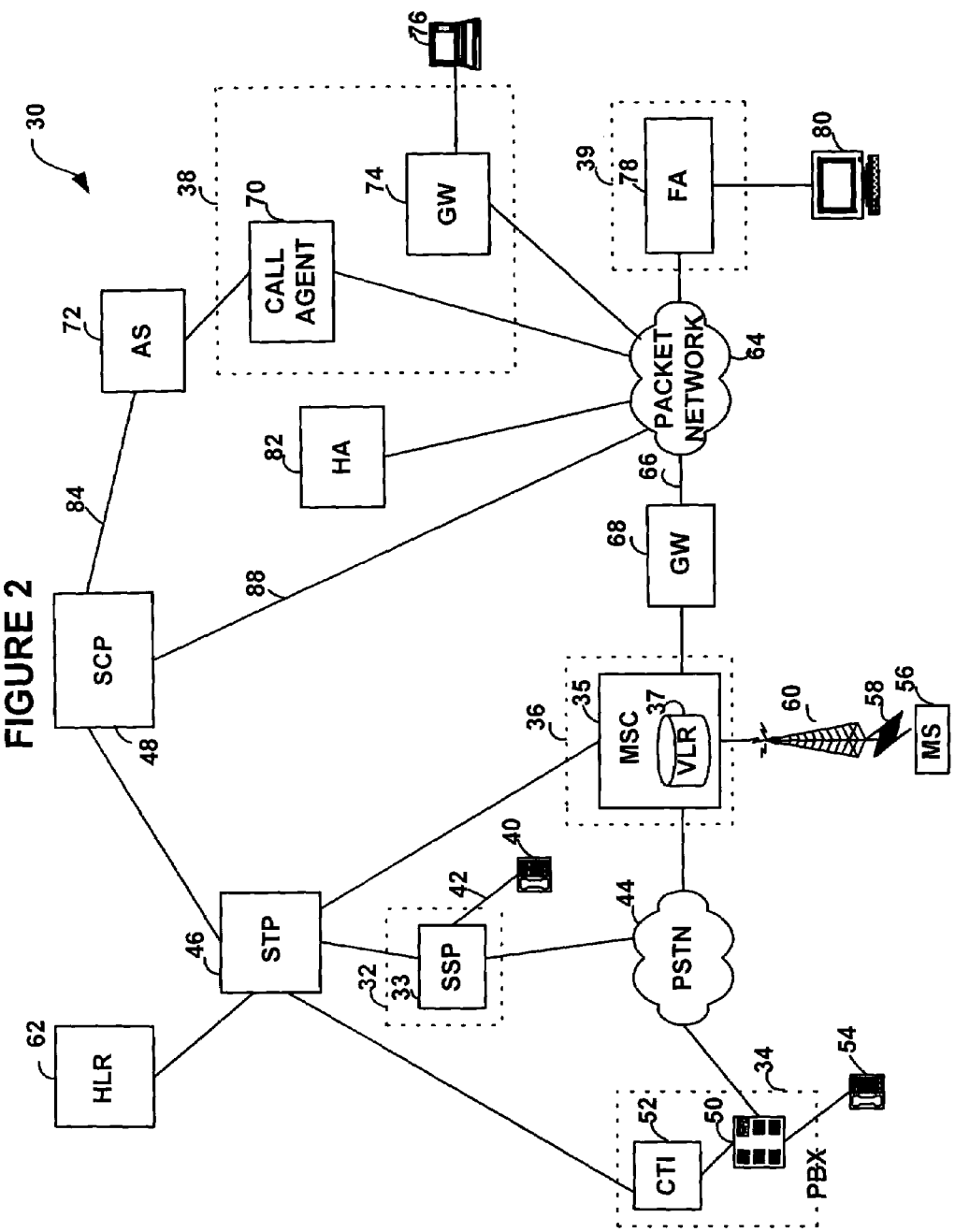
FIG. 2 is a block diagram illustrating a telecommunications network including a plurality of serving nodes and central control points.

Network 10 is generically representative of an Advanced Intelligent Network ("AIN") arrangement in which an exemplary embodiment of the present invention can be implemented. The particular arrangement, however, may take any of a variety of forms. To further illustrate arrangements in which the invention can be implemented, FIG. 2 depicts a network 30, which comprises at least five example serving systems, designated respectively by reference numerals 32, 34, 36, 38 and 39.

Example serving system 32 is principally a landline serving system, which typically comprises a landline switch (SSP) 33, such as a Nortel DMS-100 or DMS-250. Serving system 32 serves a plurality of landline subscriber stations, of which an exemplary station 40 is shown coupled by link 42 (typically a twisted copper pair of wires), and the SSP includes a set of logic indicating how to process calls involving those stations. Serving system 32 is coupled to a transport network such as the public switched telephone network ("PSTN") 44, and further to a signaling network represented by STP 46. In turn, signaling network is coupled to a central control point such as service control point (SCP) 48. SCP 48 includes a set of service logic to perform AIN functions for calls being served by system 32. When serving system 32 encounters a predefined trigger point in its service logic, it pauses call processing and sends a signaling message via STP 46 to SCP 48. SCP 48 interprets the message and applies its own service logic, and SCP 48 then typically returns a response signaling message via STP 46 to serving system 32, instructing serving system 32 how to handle the call.

Example serving system 34 comprises a PBX server 50 coupled to a computer subscriber stations (e.g., corporate telephones or the like), an exemplary one of which is shown as station 54 for instance. The serving system (typically CTI 52) may maintain one or more subscriber profiles that define service parameters for the various stations being served. When the serving system receives a call to or from station 54, the CTI may then apply a set of logic based on the associated subscriber profile and, in doing so, may encounter a trigger point that causes the CTI to query SCP 48 for guidance. The CTI might then pause processing and send a signaling message via STP 46 to SCP 48, and the SCP might then apply its own service logic and send a response message to the CTI instructing system 34 how to handle the call. In one embodiment, CTI 52 and SCP 48 may communicate via the Internet or a Transmission Control Protocol/Internet Protocol ("TCP/IP") interface such as a Telcordia two-way Generic Data Interface ("GDI") between CTI 52 and Telcordia ISCP.

Example serving system 36 is principally a wireless serving system, which typically comprises a mobile switching center (MSC) 35, such as a Lucent or Nortel MSC. Serving system 36 serves a plurality of wireless subscriber stations, of which an exemplary station 56 is coupled via an air interface 58 and base station 60. Serving system 36 further typically includes a visitor location register (VLR) 37, which maintains service logic (e.g., profiles) for wireless stations currently being served by system 36. Serving system 36 is also coupled via STP 46 to a home location register (HLR) 62, which, in this example, serves as the home register for wireless station 56. HLR 62 may perform Wireless Intelligent Network ("WIN") functions for calls being served by system 36. For instance, when serving system 36 receives a call for station 56 and station 56 is busy, serving system 36 may encounter a trigger and responsively pause processing and send a signaling message via STP 46 to HLR 62. HLR 62 would then interpret the message and apply its own service logic, and HLR 62 would then return a response signaling message via STP 46 to serving system 36, instructing serving system 36 how to handle the call. In addition, SCP 48 may perform AIN functions for serving system 36 in a similar fashion. Alternatively, the HLR and SCP might communicate with each other, to have one execute service logic based on parameters provided by the other.

Traditional landline and wireless communications networks have been based principally on a circuit-switched arrangement, in which a switch (e.g., SSP or MSC) sets up and reserves an actual circuit with a remote switch, maintaining the circuit for the duration of the call. Recognizing the inherent inefficiency of this arrangement, the telecommunications industry has begun to embrace various "next generation networks" instead. Such networks typically employ packet-switched communication links (in addition to or instead of circuit-switched links). A gateway or "network access server" typically receives a media stream (e.g., voice, video, etc.) and/or a pure data stream and encodes and packetizes the stream into a sequence of packets. Each packet bears a header identifying its source and destination address as well as other information. The packets may be routed independently from node to node through a network and then re-ordered and reassembled by a gateway at the destination end for output to a receiving entity (e.g., person or machine). Alternatively, the packets may follow an established "virtual circuit," each traversing the same path from node to node and ultimately to the destination gateway.

For purposes of illustration, example serving system 36 is shown coupled to two transport networks, PSTN 44 and a packet-switched network 64 (such as the Internet, for instance). Serving system 36 may be coupled to the packet network 64 by a link 66 that includes an "interworking function" (IWF) or gateway 68, which is arranged to convert between circuit-switched voice and/or data transmissions handled by system 36 and a packet sequence appropriate for transport over network 64 (e.g., as an ATM or Voice over IP transmission). (In practice, the IWF might hang off of a trunk of MSC 35.) In this way, serving system 36 can provide connectivity for wireless subscriber station 56 over both the PSTN and the packet-switched network. Other next generation network arrangements are possible as well.

As presently contemplated, next generation networks may employ AIN principles as well. For example, a network access server may communicate with a "call agent" node on the packet-switched network. The call agent node may serve as a gatekeeper, typically including connection manager, connection performer, and service management layers for routing calls through the packet network. (The call agent node may also be referred to as a "service manager," or "soft switch.") To take advantage of existing architecture, the service logic for providing AIN telecommunications services then typically resides on a separate "application server" also coupled with the packet-switched network or coupled directly with the call agent node. (The application server may itself be an SCP, for instance). The call agent and gateway may cooperatively be considered a type of "serving system" for a media stream and/or data stream being transmitted in a packet switched network, and the application server may be considered a type of central control point. As in traditional AIN arrangements, the serving system may then query the central control point, providing parameters such as the source and destination addresses, and the central control point can execute appropriate service logic and return call handling instructions. For instance, the application server may direct the serving system to redirect the packet stream to a "forwarding" address or other location.

As shown in FIG. 2, for instance, serving system 38 comprises a call agent node 70 (e.g., a Telcordia Service Manager or a Lucent Softswitch), which is coupled to (or a node on) packet network 64. Call agent node 70 is in turn coupled to an application server ("AS") node 72, which may itself be an application residing on an SCP, HLR, CTI or similar entity. (For instance, as presently contemplated, AS 72 and SCP 48 may be provided as a common entity). Alternatively, both the call agent node and the application server node might be independent nodes on packet network 64. Serving system 38 may further comprise a gateway ("GW") or other such node (e.g., switch, hub, router, etc.), which may seek to route packets representing real-time media (e.g., voice, video, etc.) and/or data streams over the packet network. An example of such a gateway node is shown in FIG. 2 as gateway 74. Gateway 74 may provide subscriber stations with connectivity to the packet network. A representative station is shown as station 76.

Call agent node 70 may maintain a set of subscriber profile logic, including parameters such as trigger points, for subscribers such as station 76. When gateway 74 or another node seeks to route a packet sequence to or from station 76, the node may then communicate with call agent 70 (e.g., via a protocol such as MGCP, SGCP, SIP or H.323) to obtain call handling instructions. Call agent 70 may in turn encounter a trigger point in the subscriber profile and responsively communicate with AS 72 to obtain AIN service. In practice, call agent 70 may communicate with AS 72 according to an AIN 0.2-like protocol, over TCP/IP, or according to any other suitable protocol (e.g., SIP, H.323 or straight SS7). Thus, for instance, call agent 70 may generate and send to AS 72 a TCAP query message defining various parameters, and AS 72 may responsively employ an appropriate set of service logic and then generate and send to call agent 70 a TCAP response message. Call agent 70 may then instruct gateway 74 accordingly. In this arrangement, the CCP thus comprises AS 72. From another perspective, however, the CCP may be considered to include call agent 70, for instance, to the extent the call agent also provides AIN service logic to assist the gateway in handling call traffic.

Example serving system 39 illustrates another type of next generation, packet-switched network arrangement. This arrangement, known as "Mobile IP," has emerged to serve nomadic users (terminals) who connect to a wireline (or possibly wireless) network. Mobile IP ("MIP") attempts to solve a problem that arises when a mobile terminal with a permanent network address (e.g., internet protocol (IP) address) in one sub-network changes physical locations, such as moving to another sub-network. The arrangement works somewhat like a postal forwarding system. Each terminal is assigned a permanent address that is maintained by a "home agent," which might be a gateway or other entity in the terminal's home sub-network. When the terminal travels to another sub-network, the home agent will receive packets destined for the terminal. The home agent will then add a new header to the packets (or modify their existing headers) and forward them to a "foreign agent," which is a node serving the foreign sub-network. The foreign agent then de-capsulates the packets and forwards them to the mobile terminal.

As presently contemplated, AIN principles can be applied in a Mobile IP arrangement as well. In particular, the sub-network in which the mobile terminal is currently located could be considered a serving system, and the terminal's home sub-network could be considered the terminal's home system. Thus, as contemplated, a subscriber's home agent can be programmed to serve as a central control point, somewhat like an HLR or SCP in a wireless network, and the foreign agent can be programmed to employ subscriber profiles for visiting terminals, somewhat like the combined MSC/VLR entity in a wireless network.

In FIG. 2, example serving system 39 is thus shown to comprise a MIP foreign agent ("FA") 78. Typically, FA 78 might be a gateway node on packet network 64, arranged to convert between circuit-switched data and/or voice on one side and packet traffic appropriate for packet network 64 on the other side. However, FA 78 can take other forms. Then somewhat like serving system 36, system 39 would act as a serving system for nomadic stations (whether landline or wireless) that are visiting a given sub-network with which FA 78 is associated. One such station is depicted by way of example as station 80. In turn, packet network 64 is also coupled to (or includes) a home agent ("HA") 82, which, in this example, serves as the home agent for station 80. As such, HA 82 may play the part of an AIN central control point, maintaining a set of service logic and providing call handling instructions to serving system 39. The functionality of HA 82 may reside on an SCP or HLR, for instance.

As thus illustrated, each serving system in network 30 is typically served by one or more particular CCPs, which is usually (but not necessarily) owned and operated by the same carrier that operates the serving system. A CCP in one carrier's system, however, can be arranged to provide AIN functionality to serve subscribers operating in another carrier's system. Alternatively, a CCP in one carrier's system can be arranged to provide AIN functionality for another CCP in the same carrier's system. One way to accomplish this, for instance, is to have one set of CCP service logic communicate with another set of CCP service logic, in order to request and provide instructions on how to handle a given call. The two sets of service logic may reside on separate physical CCP entities or may reside on separate partitions of the same CCP entity (e.g., as landline and wireless segments of a given SCP), or may be in another arrangement. Thus, for instance, when one CCP receives a service request from a serving system, the CCP might responsively forward the request to another CCP, send instructions to another CCP, or seek guidance from another CCP.

As shown in FIG. 2, for instance, SCP 48 might be coupled by a communications link 84 (which could be a packet switched link, for instance) with AS 72. That way, when a serving system on packet network 64 seeks guidance from AS 72, AS 72 can in turn seek guidance from SCP 48. In response to instructions from SCP 48, AS 72 can then pass a signaling message back to the querying serving system, instructing the system how to handle the call. Advantageously, then, a user engaging in communications over a next generation packet switched network can benefit from service logic maintained in another network, such as the user's home telephone network. For instance, the services and features that are applied to the user's home telephone can be applied as well to communications over the next generation network. The same thing can be said for other combinations of networks as well, such as mobile and landline, for instance.

An exemplary embodiment of the invention will now be described with respect to the portion of network 30 comprising serving system 32 (comprising an SSP), representative subscriber station 40, and SCP 48 coupled to the serving system through STP 46. It should be understood, however, that this example applies by analogy to any other network arrangement or combination of network arrangements, such as other portions of FIG. 2, for instance, or other arrangements not shown in FIG. 2. Thus, for example, where this description refers to SCP 48 as the central control point, other types of central control points, possibly with disparate physical and functional arrangements, could be substituted. Similarly, where the description refers to serving system 32 or subscriber station 40, other serving systems or subscribers could be substituted.

Figure 3:
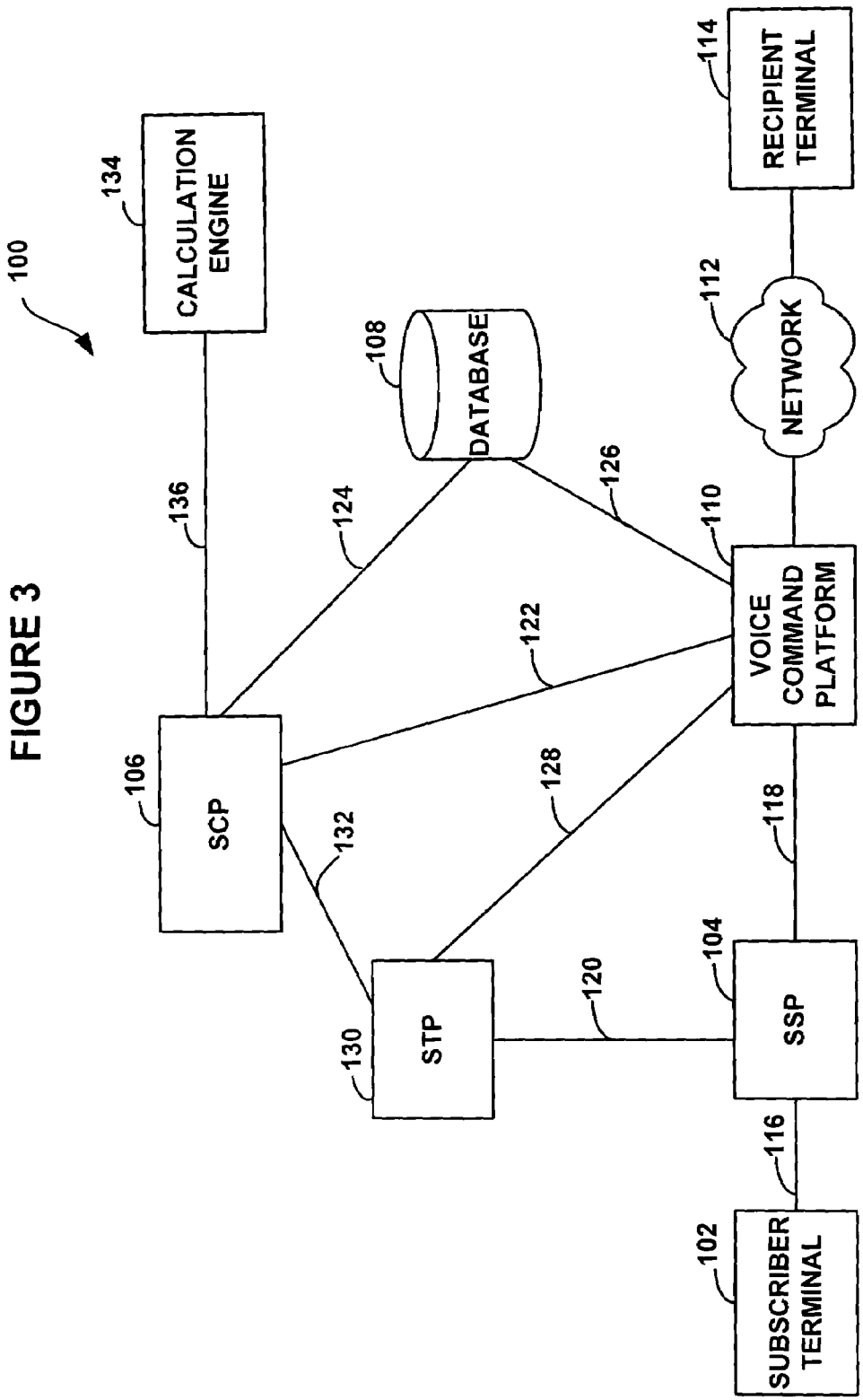
FIG. 3 is a block diagram illustrating a telecommunications network for providing advertisement-supported services in accordance with exemplary embodiments.

FIG. 3 illustrates a block diagram of a telecommunications network 100 in which an exemplary embodiment of the present invention can be employed. Specifically, the illustrated network 100 may provide advertising supported communications services, according to which, a subscriber is granted a free or discounted calling time in return for the subscriber listening to or viewing advertisements. Hereinafter, it should be understood that the term "subscriber" may refer to an originating subscriber, a terminating subscriber, an originating subscriber terminal, or a terminating subscriber terminal, for instance.

As shown in FIG. 3, network 100 includes a subscriber terminal 102 and a recipient terminal 114. Terminals 102 and 114 may take any suitable form, such as, for instance, a telephone, a cellular telephone, a computer, a fax machine or a PDA. As an example, terminal 102 and terminal 114 may be code division multiple access ("CDMA") telephones, supporting the IS-95, IS-41 and/or GSM Intersystem Operation Standards ("IOS").

As shown in FIG. 3, terminal 102 is coupled by a communication link 116 to an SSP 104, and SSP 104 is in turn coupled by a voice/data communication link 118 to a voice command platform ("VCP") 110. VCP 110 is then shown coupled to a network 112, which provides connectivity in turn to terminal 114. Network 112 may comprise a packet-data network such as the Internet and/or may comprise other networks such a local area network (LAN) and/or a wireless network, for instance.

As further shown in FIG. 3, SSP 104 is coupled by a signaling path 120 to an STP 130. Also coupled to STP 130 by a link 132 is an SCP 106. Further, VCP 110 is coupled to SCP 106 by a signaling path 122 and to STP 130 by a signaling path 128. With this arrangement, SSP 104 can engage in signaling communications directly with VCP 110 via signaling path 120, STP 130 and signaling path 128. Alternatively, SSP 104 can engage in signaling communications with SCP 106 via signaling path 120, STP 130 and signaling path 132, and SCP 106 can engage in signaling communications with VCP 110 via signaling path 122.

As additionally shown in FIG. 3, network 100 includes a database 108. Database 108 may be included in or accessible to SCP 106 and/or VCP 110. As shown in FIG. 3, for instance, database 108 may be coupled to SCP 106 by a link 124 and to VCP 110 by a link 126.

VCP 110 may facilitate various interactions with users, such as playing announcements, collecting dual-tone-multi-frequency ("DTMF") digits, recognizing speech, and, according to an exemplary embodiment, playing advertisements. The VCP 110 may be embedded in one of several conventional platforms. For instance, an Intelligent Peripheral ("IP") may include VCP 110. As known in the art, an IP may be arranged to provide assorted services, including tone generation, voice recognition, playback, compression, call control, recording, and DTMF detection/collection. Alternatively, a service node ("SN") may include VCP 110. A service node may provide voice interactions with users and can facilitate and perform various enhanced services for SSP 104.

In one exemplary embodiment, the advertising supported services may be available to all subscriber terminals in communications network 100. In an alternative embodiment, only certain subscribers may be designated to receive the services. In such an embodiment, a subscriber who wishes to receive the advertising supported services may sign up to receive the services. Alternatively, a subscriber may be automatically designated to receive the advertising supported services. For example, subscribers associated with disposable mobile telephones may be automatically designated to receive advertising supported services.

In one exemplary embodiment, database 108 stores advertisement records. The advertisement records stored in database 108 may be arranged into different categories. For example, advertisements provided to a subscriber may be based on certain characteristics associated with the subscriber that may be specified in a subscriber's record. For example, a subscriber's record may specify one or more advertisement identifiers that may link to a predetermined set of advertisement records stored in database 108 or a different network entity. In such an embodiment, the advertisement identifiers may be selected based on the subscriber's interests, for instance. Different criteria for selecting advertisements to be provided to a subscriber are possible as well.

As further shown in FIG. 3, network 100 includes a calculation engine ("CE") 134. CE 134 is a programmed computer running an application to dynamically manage a subscriber balance of free calling time as a subscriber listens or views advertisements on subscriber terminal 102, for example. In the shown arrangement, CE 134 is coupled to SCP 106 by a link 136. Link 136 may be a wide area network such as the Internet, and CE 134 and SCP 106 may communicate over the link using a TCP/IP interface such as Bellcore's ISCP Generic Data Interface. FIG. 3 illustrates CE 134 as a separate entity coupled to SCP 106. However, the functions of CE 134 may instead be programmed into SCP 106 or facilitated by one or more other entities in the network.

According to an exemplary embodiment, in the case of advertising supported services being delivered to devices that support media rich advertising, such as hypertext or video, subscriber terminal 102 may further communicate with a call agent, such as call agent 70 illustrated in FIG. 2 and FIG. 3, connected to SCP 106 and further connected to a media server (not shown). In such an embodiment, upon receiving a call request from subscriber terminal 102, SCP 106 may determine whether subscriber terminal 102 supports hypertext or video based on a type of the device, for instance. In an alternative embodiment, the call request received from subscriber terminal 102 may include data indicating the types of media being supported on subscriber terminal 102.

To provide hypertext advertisement to subscriber terminal 102, SCP 106 may send a SIP message to subscriber terminal 102 via the call agent, and the SIP message may include payload that contains web page links associated with web pages including advertisements to be displayed to the subscriber. In one embodiment, upon receiving the SIP message, subscriber terminal 102 may communicate with the media server to retrieve the web pages for the display to the subscriber. Alternatively, when the call agent receives the SIP message including web page links on the media server, the call agent may send instructions to the media server to provide the web pages to subscriber terminal 102.

In an embodiment involving providing hypertext advertisement to a subscriber, an acknowledgement mechanism may be employed to indicate that the subscriber has seen the advertisement. For example, subscriber terminal 102 may include a graphical/physical selection input, such as a button, link or checkbox, which, when selected by the subscriber, triggers subscriber terminal 102 to send to SCP 106 a SIP reply message indicating that the subscriber has viewed the advertisement. In an alternative embodiment, web pages being provided to subscriber terminal 102 may include a pre-programmed "acknowledgement mechanism" that triggers a start of a timer when the subscriber starts viewing a web page. Further, the acknowledgement mechanism may monitor how long the subscriber is viewing the web page and may automatically send a SIP reply message after a predetermined timeout period.

To provide video advertisements to subscriber terminal 102, SCP 106 may employ a third party call control mechanism, in which SCP 106 may initiate communication sessions between a number of network entities that, in this embodiment, may include subscriber terminal 102 and a media server. In such an embodiment, SCP 106 may send to subscriber terminal 102 and to the media server SIP INVITE messages including session description parameters ("SDPs") associated with video advertisements. Next, a communication session, such as a Real Time Transport Protocol (RTP) session, may be established between subscriber terminal 102 and the media server. Once subscriber terminal 102 and the media server acknowledge the receipt of the SIP INVITE messages, and the communication session is established, the media server may initiate providing video advertisements to subscriber terminal 102. Once the media server finishes providing the video advertisements to subscriber terminal 102, the media server may send to SCP 106 a message indicating the end of providing the advertisements. When SCP 106 receives the message, a subscriber may receive a free calling credit or a discounted calling credit. It should be understood that different embodiments are possible as well.

Figure 4:
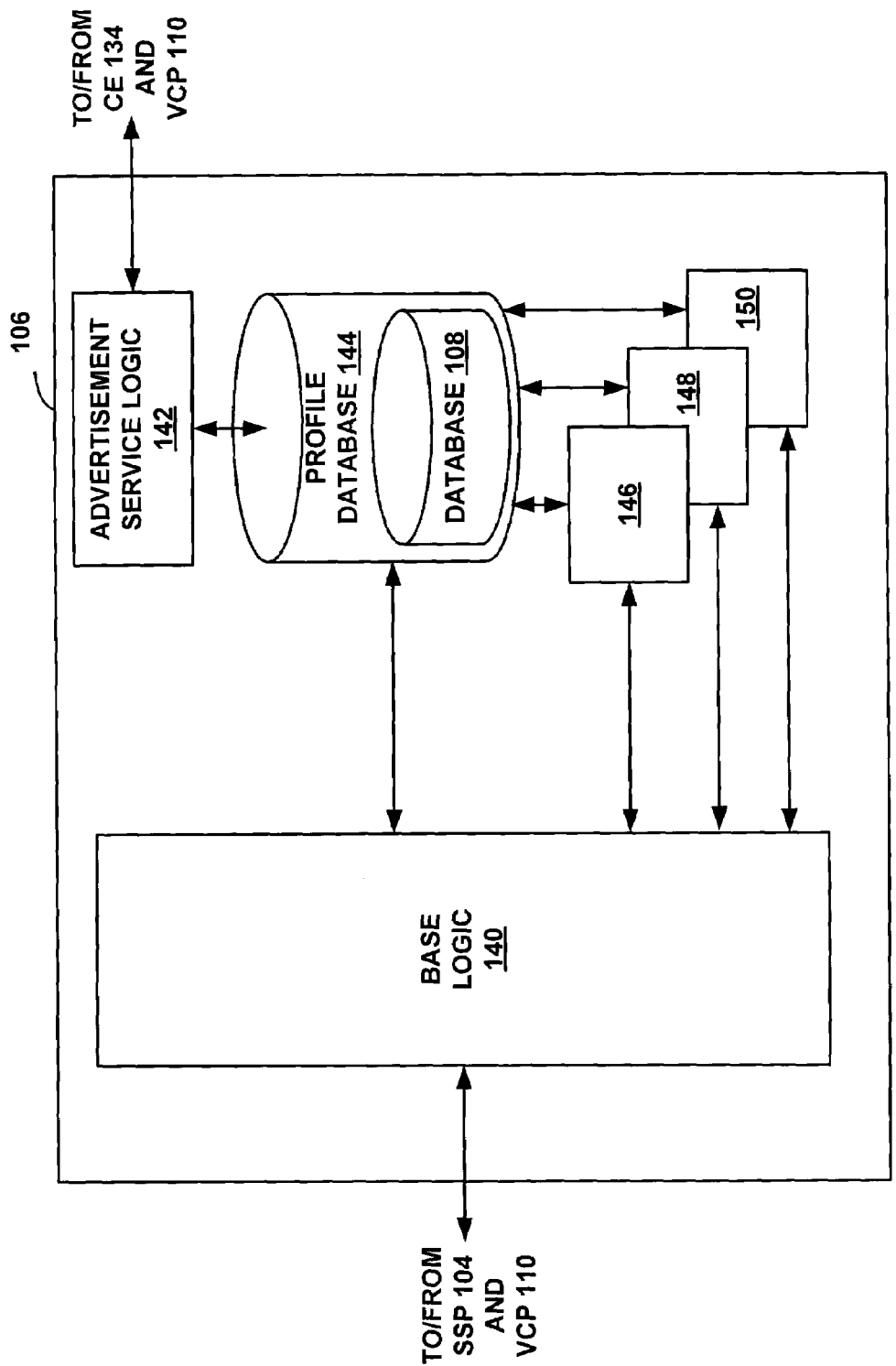
FIG. 4 is a block diagram illustrating a service control point (SCP) that may be employed in an exemplary embodiment.

FIG. 4 is a block diagram illustrating exemplary SCP 106 in greater detail. FIG. 4 illustrates an exemplary embodiment in which database 108 is internally stored on SCP 106. However, it should be understood that SCP 106 may communicate with database 108 via communication link 124, as illustrated in FIG. 3. In FIG. 4, double-headed arrows indicate connections between the components. SCP 106 may be a Telcordia SCP, which typically includes a number of functional components and is therefore also referred to as an Integrated SCP or "ISCP."

SCP 106 includes a base service logic module 140, which defines functionality for decoding and encoding TCAP messages received from and sent to SSP 104. Base service logic module 140 also includes service logic for determining what databases and service logic modules to invoke in order to process the information from the decoded TCAP messages. For example, base service logic module 140 has access to a profile database 144 containing service profiles of the subscribers. Database 144 further includes database 108 that stores subscriber records. A subscriber record may identify a subscriber terminal by a MIN or other identifiers, specify what services the subscriber terminal subscribes to, i.e., advertising supported services, call forwarding, etc., and what service logic module to run for each service. The service profile may also include certain service parameters that SCP 106 can use to apply one or more of the customer's services and can thus be considered part of the service logic that SCP 106 will apply to the subscriber.

SCP 106 further includes a number of service logic modules 146–150 associated with AIN services. Although three service logic modules are illustrated in FIG. 4 for purposes of illustration only, it should be understood that SCP 106 may include more or fewer service logic modules. To provide a given AIN service, base service logic module 140 may invoke one or more of modules 146–150 as a kind of subroutine call. In particular, base service logic module 140 passes a set of input parameters to the service logic module, and the module returns a set of output parameters out of which base service logic module 140 can encode the TCAP message or messages needed to provide the desired service or with which the base service logic module can perform other functions.

SCP 106 may also take other forms. As an example, for a given subscriber or a group of subscribers, SCP 106 may maintain a distinct set of call processing logic, which SCP 106 may employ for calls involving that subscriber or group, rather than, or in addition to, employing a base logic module 140 or special service modules 146–150.

In an exemplary embodiment, SCP 106 includes an advertisement service logic module 142. When advertisement service logic module 142 detects a call from a subscriber who wishes to obtain free calling time, or a call from a subscriber who is designated to receive advertisement based services, advertisement module 142 communicates via link 136 with CE 134 to establish and track a free calling balance in return for a subscriber listening to or viewing advertisements before the call from the subscriber is connected to a destination terminal.

Additionally, advertisement service logic 142 communicates via link 122 with VCP 110 in order to carry out various functions associated with advertisement services. For example, upon detecting a call request from a subscriber who wishes to receive advertisement services, SCP 106 may instruct SSP 104 to route the call to VCP 110 by providing to SSP 104 an IP address or a trunk number associated with VCP 110. Further, advertisement module 142 may send to VCP 110 instructions to retrieve advertisement records from database 108 and to start playing advertisements to the subscriber when the call is routed to VCP 110.

In an alternative embodiment, before providing any advertisements to a subscriber, advertisement module 142 may instruct VCP 110 to query the subscriber to specify a number of minutes that the subscriber wishes to talk. Then, based on the number of minutes specified by the subscriber and the destination identifier associated with a destination terminal, advertisement module 142 may determine a number of advertisement records to be provided to the subscriber. Further, in an alternative embodiment, the length of advertisement records may vary, and, instead of determining a number of advertisement records to be provided to the subscriber, advertisement module 142 may determine a total advertisement time. In either embodiment, advertisement module 142 may instruct VCP 110 to provide to the subscriber the information related to the length or a number of advertisements to be presented to the subscriber for the number of minutes that the subscriber wishes to talk. Responsively, the subscriber may either accept the advertisement time or lower/increase the number of minutes that the subscriber wishes to talk. If the number of minutes that the subscriber wishes to talk is altered, the process of determining the advertisement time to be provided to the subscriber may be repeated.

As the subscriber listens to the advertisements before the call is connected, CE 134 tracks and updates the free calling balance for the subscriber. In one embodiment, subscriber may stop listening to the advertisements by dialing a predetermined sequence of digits that trigger SCP 106 to stop playing the advertisement and, further, to connect the call to a dialed number and start decrementing the free calling balance as the call progresses. Further, during the progress of the call, as the free calling balance is decremented based on the charge permitted to connect the source to the destination, when CE 134 or advertisement service module 142 determines that the free calling balance reaches a predetermined low threshold level, logic module 142 may request SSP 106 to connect a subscriber terminal to VCP 110 so that VCP 110 can play a low balance message and query a subscriber for instructions. In one exemplary embodiment, VCP 110 may ask a subscriber whether the subscriber would like to listen to more advertisements in return for free calling time. Alternatively, when the free calling balance reaches a call termination threshold level, the call may be terminated. Further, alternatively, if the subscriber receives a discounted calling time rather than a free calling time for listening to or viewing advertisements, the call may continue at the regular rate.

In operation, when SSP 104 receives a request to connect a call from subscriber terminal 102, i.e., when SSP 104 receives dialed digits including a destination identifier associated with recipient terminal 114, SSP 104 will apply its own minimal set of service logic for the subscriber. Further, to obtain additional instructions, SSP 104 may generate and send to SCP 106 a TCAP message, defining parameters about the call request, i.e., the dialed digits and other parameters.

When SCP 106 receives a TCAP message from SSP 104, base logic 140 parses the message to identify the parameters and stores various parameters of the message in a memory unit. In accordance with an exemplary embodiment, SCP 106 may detect a calling subscriber as a subscriber who is designated to receive advertisement services using an origination identifier, such as a MIN, associated with a subscriber terminal. In such an embodiment, SCP 106 may map the originating identifier to a predetermined subscriber record. Based on the subscriber record, SCP 106 may determine whether the subscriber is designated to receive advertisement services. In an alternative embodiment, a subscriber may dial a predetermined service code that represents an advertisement service request. Service codes often include an asterisk followed by a sequence of digits, such as *123, for example. However, it should be understood that service codes could take different forms. The service code may be pre-pended to the dialed number.

Once base service logic 140 finishes executing the appropriate service logic for the subscriber, it may generate and return a response TCAP message to SSP 104 including instructions to route the call to VCP 110. Additionally, base service logic 140 may provide instructions to VCP 110.

Further, alternatively, in addition to determining if the subscriber associated with subscriber terminal 102 is designated to receive advertisement services, SCP 106 may determine whether the subscriber associated with recipient terminal 114 is authorized to receive a call. For example, the subscriber associated with recipient terminal 114 may be a prepaid service subscriber having a predetermined calling time limit. In such an embodiment, SCP 106 may determine if the subscriber associated with recipient terminal 114 has a sufficient calling balance to have the call connected from subscriber terminal 102. In one embodiment, CE 134 may be configured with a database arranged to store subscriber records associated with subscribers receiving prepaid services, and SCP 106 may query CE 134 to determine if the subscriber associated with recipient terminal 114 has sufficient balance.

If SCP 106 determines that a subscriber associated with recipient terminal 114 does not have a sufficient balance, SCP 106 may further determine if the subscriber is an advertisement service subscriber. If so SCP 106 may trigger VCP 110 to query the subscriber associated with recipient terminal 114 whether the subscriber wishes to listen to or view advertisements in order to receive the call from subscriber terminal 102. If so, advertisements may be provided to the subscriber. In such an embodiment, if the subscriber associated with recipient terminal 114 does not have a sufficient balance or the subscriber does not wish to receive a free calling time, SCP 106 may instruct VCP 110 to inform the subscriber associated with subscriber terminal 102 that recipient terminal 114 is not available to receive the call. However, it should be understood that different embodiments are possible as well.

Figure 5:
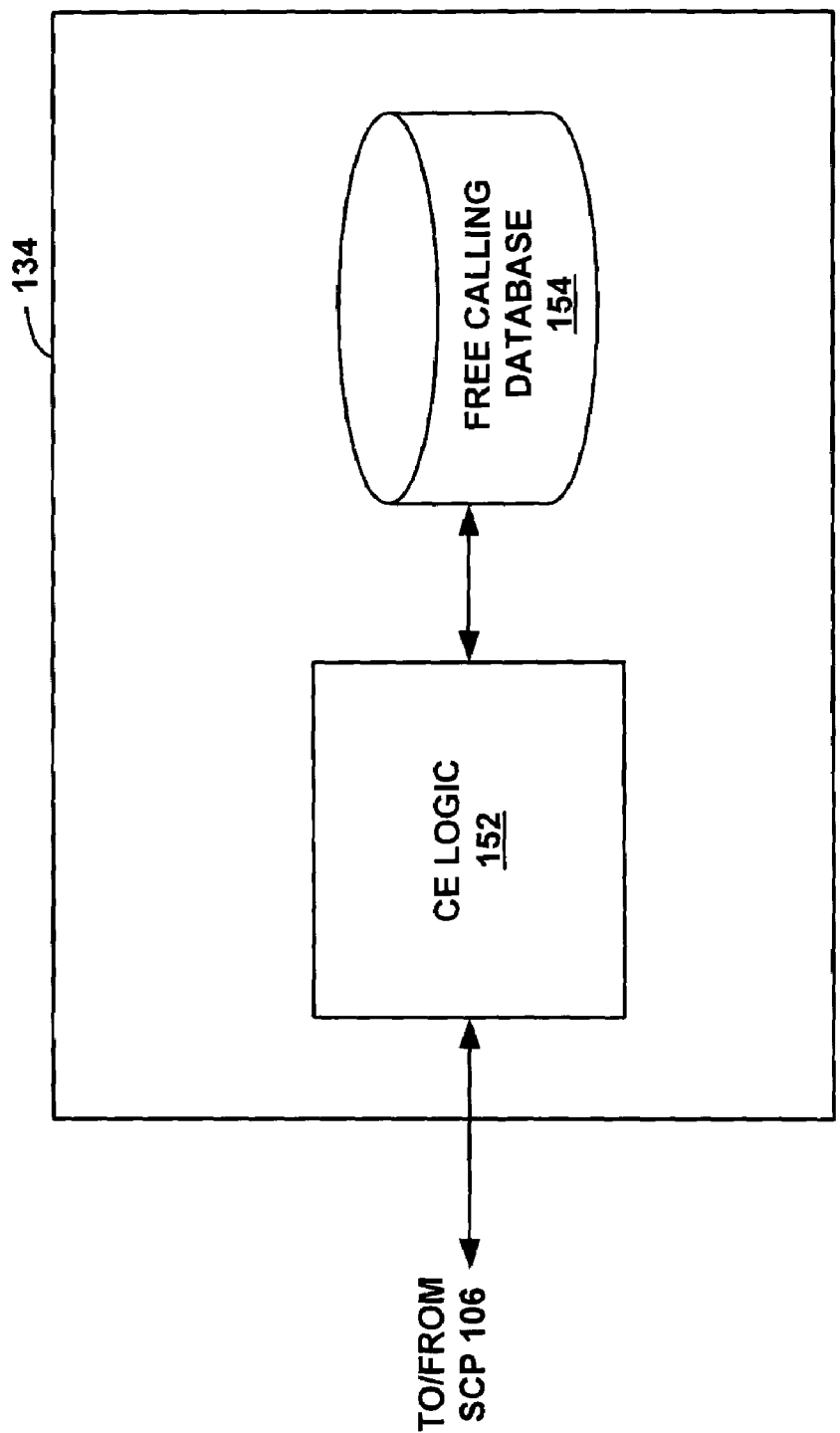
FIG. 5 is a block diagram illustrating a calculation engine (CE) that may be employed in an exemplary embodiment.

Referring next to FIG. 5, an exemplary calculation engine 132 is illustrated in greater detail. As shown in FIG. 5, calculation engine 132 includes a calculation engine logic module 152 and a free-calling database 154. In an alternative embodiment, free-calling database 154 may instead be located in another entity in network 100, and calculation engine 132 may access an external free-calling database via a wide area network such as the Internet, for instance.

Calculation engine 132 creates a temporary subscriber account for a subscriber who decides to receive free calling time in return for listening to or viewing advertisements. According to an exemplary embodiment, the subscriber is granted the free calling time based on a number of advertisements provided to the subscriber or a number of minutes that a subscriber listens to advertisements. For example, when the free calling time is granted based on the number of advertisement being provided to the subscriber, the free calling time may be determined based on a number of complete advertisements provided to the subscriber. In such an embodiment, a partial credit or no credit may be given if the subscriber does not listen to complete advertisements. It should be understood that the exemplary embodiments are not limited to creating temporary accounts, and any free calling time earned by the subscriber could also.be used for future calls.

Calculation engine logic 152 may correlate each minute of advertisements to which a subscriber listens, or a number of advertisements provided to the user, with a certain number of credits of calling time. According to an exemplary embodiment, free-calling database 154 may maintain a first table that indicates the weight of each credit based on a destination identifier such as a MIN or a PSTN telephone number dialed by a subscriber associated with subscriber terminal 102. It should be understood that the destination identifier is not limited to the MIN or the PSTN telephone number, and different destination identifier could also be used. For example, the destination identifier may be a Network Access Identifier ("NAI"), a domain name or an ENUM, all of which are commonly known to those skilled in the art.

Alternatively, free-calling database 154 may include a second table indicating a second measure for determining the weight of each credit. Calculation engine logic 152 may reference both of these tables to determine an appropriate number of minutes of free calling time that should be provided to the subscriber for the given call. For example, according to the second table, the weight of each credit may be determined based on a zone measure that may be determined based on a distance between subscriber terminal 102 and recipient terminal 114. If subscriber terminals 102 and/or 114 are landline terminals, the distance between the terminals may be determined based on the area codes and telephone numbers' prefixes associated with the communicating terminals. In an alternative embodiment for mobile subscriber terminals, SCP 106 may communicate with a predetermined service node arranged to determine the current zone location associated with the two terminals. Any currently existing or later developed systems for determining current location associated with mobile terminals may be used, and the present invention is not limited to any predetermined system. Further, in an alternative embodiment, Global Positioning System ("GPS") may be employed to determine the current location associated with the two terminals, and the current locations may be translated to a zone measure. Further, for example, if the originating subscriber terminal is located outside of its service provider's network, the advertisement-supported services may be denied to the subscriber, or additional charges may be applied to the subscriber balance.

Further, in an alternative embodiment, calculation engine logic 152 may grant a set of monetary credit values, or other set credit value, for each minute of advertisements listened by a subscriber or a number of advertisements viewed by the subscriber. In such an embodiment, free-calling database 154 may include a rating table for determining a number of free minutes based on the credit values assigned to a subscriber and a destination identifier specified by the subscriber placing a call. For example, given a predetermined amount of credit, calculation engine logic 152 may assign more free/discounted minutes to local or short-distance calls, and less free/discounted minutes to long-distance calls.

According to an exemplary embodiment, calculation engine logic 152 may be further arranged to time a duration of a call and decrement a free calling balance associated with a subscriber as the call progresses. Further, calculation engine logic 152 may be arranged to notify SCP 106 when the free calling balance reaches a low threshold level. Additionally, according to an exemplary embodiment, when the call terminates, SCP 106 may notify CE 132 about the termination of the call. In one embodiment, calculation engine logic 152 may be arranged to discard any unused minutes or keep the free calling balance for any future phone calls.

According to an exemplary embodiment, SCP 106 may be placed in so-called ISUP "looparound" signaling path with SSP 104 to cut into or terminate an ongoing call when the free calling time reaches a predetermined threshold level, for instance. More information on creating "looparound" trunks may be found in U.S. patent application Ser. No. 09/392,984, entitled "Method and System for Monitoring Telecommunications Traffic," filed Sep. 9, 1999, the contents of which are fully incorporated herein by reference. In such an embodiment, SSP 104 may be programmed with logic authorizing SSP 104 to route calls to SCP 106 as though SCP 106 were a switch. Rather than seeking to route the call along a normal trunk connecting SSP 104 and SCP 106, SSP 104 may be programmed to route calls along a special "looparound trunk" ("the looparound trunk") at SSP 104 which may be tied together with another trunk (the "inbound looparound trunk") at SSP 104.

According to SS7, call setup and tear down may be accomplished by a series of messages in the Integrated Services Digital Network User Part ("ISUP") layer. In such an embodiment, when a subscriber decides to listen or receive advertisements, SSP 104 may seek to set up the call to SCP 106 along the outbound looparound trunk by sending an Initial Address Message ("IAM") message to SCP 106. Responsively, SCP 106 may return an IAM message to SSP 104 purporting to set up the same call along the inbound looparound trunk. In such an embodiment, SSP 104 ends up routing the call to itself, from the outbound looparound trunk to the inbound looparound trunk, and then to a destination, while leaving a signaling path for the call through SCP 106. Consequently, since SCP 106 sits in the signaling path of the call, it can time the call, track the subscriber's free calling balance and provide that information to CE 132. Further, SCP 106 may release the call or connect the call to VCP 110 when the balance is low. However, it should be understood that the exemplary embodiments are not limited to such a set up, and different methods for cutting into the call or terminating the call could also be used.

Calculation engine logic 152 may be further arranged to keep track of a number of free calling minutes that are provided to a subscriber. For example, a subscriber may be limited to a predetermined number of free calling minutes per week, month or year. In such an embodiment, when SCP 106 detects a subscriber designated to receive advertisement services, SCP 106 may first query CE 132 to determine if the subscriber has not exceeded a predetermined free calling time limit. Then, if the limit has not been exceeded, the subscriber may receive advertisement services.

Referring next to FIG. 6, there is shown a flow chart illustrating an exemplary method 160 for connecting a call from a subscriber designated to receive advertising-supported services in a telecommunications network.

Beginning at step 162, a first network entity receives a call request to connect a call from a subscriber terminal to a recipient terminal. The call request includes dialed digits such as a destination identifier associated with the recipient terminal. According to an exemplary embodiment of network 100 illustrated in FIG. 3, the first network entity may include SSP 104 that receives the call request to connect a call from subscriber terminal 102 to recipient terminal 114. Further, in one embodiment, the destination identifier may be or may include a PSTN telephone number, a MIN identifier, an IP address, a domain name, a NAI, or an ENUM associated with recipient terminal 114. Further, in an alternative embodiment, the call request may additionally include a service code appended to the destination identifier.

At step 164, in response to receiving the call request, a second network entity determines whether the subscriber is designated to receive advertisement services. In one embodiment, the first network entity may generate and send to the second network entity such as SCP 106 a TCAP request message including a request for call-handling instructions. The TCAP message may define call request information such as an originating identifier (a PSTN telephone number, a MIN, an IP address, a domain name, a NAI, or an ENUM) associated with subscriber terminal 102, a destination identifier and other indicia such as a service code. When SCP 106 receives the TCAP request message, it analyzes its parameters and determines whether the subscriber is designated to receive advertisement services. In one embodiment, if a service code is used, SCP 106 may make that determination using subscriber records. In an alternative embodiment, SCP 106 may determine whether the service code specified in the TCAP message is an advertisement service code. If the subscriber is not designated to receive advertisement services, the method continues at step 170.

If the subscriber is designated to receive advertisement services, at step 166, the subscriber receives one or more advertisements. In one embodiment, the advertisements may be played to the subscriber. In an alternative embodiment, the advertisements may be displayed to the subscriber via subscriber terminal 102.

At step 168, a second network entity determines a free calling balance for the subscriber based on the destination identifier and the advertisements such as a number of minutes that the advertisements are played, or a number of advertisements being provided to the subscriber. Further, if a subscriber accesses the advertisements using a browser, in addition to viewing advertisements on a displayed page, the subscriber may be given supplementary credit for accessing and viewing different advertisements on the displayed page. In such an embodiment, the pages accessed by the subscriber may be temporarily stored on subscriber terminal 102 so that the subscriber may view the advertisements later on.

At step 170, the call is connected from the subscriber terminal to the destination terminal, and method 160 terminates. The exemplary methods for determining the free calling balance were described in reference to FIG. 6. However, it should be understood that different methods could also be used.

FIGS. 7A and 7B are a flow chart illustrating a method 180 for connecting and managing a call for a subscriber designated to receive advertisement services according to an exemplary embodiment in which a subscriber selects a predetermined service code to receive advertisement services. According to an exemplary embodiment, the selection of the predetermined service code may include a voice input or a selection of a predetermined set of digits, for instance.

Method 180 will be described in reference to network entities illustrated in system architecture 100 of FIG. 3.

Beginning at step 182 in FIG. 7A, SSP 104 receives a call request from subscriber terminal 102. The call request defines a request to connect a call from an originating terminal (subscriber terminal 102) to a recipient terminal (recipient terminal 114 or any other customer or network terminal). In network 100, subscriber terminal 102 may be identified by an originating identifier such as a PSTN telephone number, a MIN, an IP address, an e-mail address, or a different identifier type. Similarly, recipient terminal 114 may be identified by a terminating identifier. Further, according to an exemplary embodiment, the call request received at SSP 104 from subscriber terminal 102 may further include a service code that may be appended to the terminating identifier.

At step 184, in response to the call request, SSP 104 generates and sends to a service controller, such as SCP 106 via STP 130, a message including a request for call handling instructions. In one embodiment, the request message may be a TCAP query message and may define certain call request information, such as the originating identifier associated with subscriber terminal 102, the destination identifier (dialed digits) associated with recipient terminal 114, and the service code dialed by the subscriber.

In response to receiving the TCAP query message from SSP 104, SCP 106 determines whether the call is a predefined type of call. Specifically, SCP 106 determines whether the call is from a subscriber designated to receive advertisement services. At step 186, SCP 186 analyzes the service code received in the TCAP query message to determine if the service code is an advertisement service code. If the service code is not an advertisement service code, method 180 continues at step 188, where SCP 106 examines a subscriber record stored in profile database 144 to determine if the subscriber has an advertisement service account. At step 190, SCP 106 determines if the subscriber is designated to receive advertisement services. If, according to the subscriber record, the subscriber is not designated to receive advertisement services, method 180 terminates, and the call is connected to recipient terminal 114.

If the subscriber record designates the subscriber to receive advertisement services, at step 192, SCP 106 provides call routing instructions to SSP 104 to route the call to VCP 110. The routing instructions may include a network address or a routing trunk number associated with VCP 110. Additionally, SCP 106 may provide to VCP 110 call information such as the originating identifier and the destination identifier, and instruction to provide advertisement services to the subscriber. Further, advertisement service logic 142 may trigger CE logic 152 to create a free calling balance record for the subscriber. Upon receiving the call routing instructions, SSP 104 may route the call to VCP 110.

When the call is routed to VCP 110, at step 194, VCP 110 provides advertisements to the subscriber associated with subscriber terminal 102. According to an exemplary embodiment, VCP 110 may retrieve advertisements from database 108 and play them to the subscriber. At step 196, during the playing of the advertisements, CE logic 152 determines a free calling balance for the subscriber based on the destination identifier associated with recipient terminal 114, as described in reference to FIG. 5. In one embodiment, VCP 110 may send a signaling message to SCP 106 when the subscriber starts listening to the advertisements and, further, when the subscriber stops listening to the advertisements. In an alternative embodiment, instead of providing a free calling balance, the subscriber may receive a discounted calling time based on the destination identifier and the advertisement being provided to the subscriber.

Referring to FIG. 7B, at step 198, SCP 106 determines if the subscriber has stopped listening to the advertisements. In one embodiment, the subscriber may terminate listening to the advertisements at any time by simply dialing a predetermined sequence of digits, for instance. If such an input is detected, advertisement service logic 142 may query CE logic 152 for the free calling balance. Then, SCP 106 may instruct VCP 110 to play the free subscriber balance to the subscriber and query the subscriber whether the subscriber wishes to receive more advertisements. In an alternative embodiment, the advertisements provided to the subscriber may be limited to a predetermined time period, and CE logic 152 may determine the free calling balance upon the end of playing the advertisements. If no subscriber input indicating an advertisement termination request is received, method 180 continues at step 194 in FIG. 7A.

When the subscriber finishes listening to the advertisements or viewing the advertisements, at step 200, the call is connected from subscriber terminal 102 to recipient terminal 114. At step 202, CE logic 152 decrements the free calling balance associated with the subscriber as the call progresses. According to an exemplary embodiment, when SSP 104 connects the call, SSP 104 may send to SCP 106 a signaling message defining a start time of the call. Then, advertisement service logic 142 may trigger CE logic 152 to start decrementing the free calling balance (or a discounted calling time) as the call progresses.

As the call progresses, at step 204, CE logic 152 determines whether the free calling balance reaches a threshold level. In one embodiment, a detection of the threshold level may trigger playing additional advertisements to the subscriber. In such an embodiment, if the free calling balance reaches the threshold level, at step 206, SCP 106 determines whether to provide additional advertisements to the subscriber. In one embodiment, CE logic 152 may inform advertisement service logic 142 when the free calling balance reaches the threshold level. Then, SCP 106 may signal VCP 110 to play a balance announcement. For example, VCP 110 may play the balance announcement when the free calling balance reaches the last free calling minute. However, different embodiments are possible as well. The subscriber may accept or decline receiving additional advertisement by selecting a predetermined sequence of digits or by providing a voice response.

If the subscriber decides to receive additional advertisements in return for free calling time, method 180 continues at step 194. Otherwise, CE logic 152 may decrement the free calling balance until the balance reaches a call termination threshold level. At step 208, when the free calling balance reaches the call termination threshold level, the call is terminated. In an alternative embodiment in which the subscriber receives a discounted calling time, the call may be continues at a regular rate. According to an exemplary embodiment, if the call is terminated by the subscriber before the free calling balance reaches the call termination threshold level, any free calling time left in the free calling balance created for the subscriber may be discarded. Alternatively, the free calling time left in the free calling balance may be kept and may be employed for the next call initiated by the subscriber.

It will be apparent to those of ordinary skill in the art that methods involved in the system and methods for advertising supported communications may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

Exemplary embodiments of the present invention have been described above. Those skilled in the art will understand, however, that changes and modifications may be made to this embodiment without departing from the true scope and spirit of the present invention, which is defined by the claims.

What is claimed:

1. A method for advertising-supported communications in a telecommunications network, the method comprising:
   receiving a call request to connect a call from an originating subscriber terminal to a destination subscriber terminal, the call request including a destination identifier associated with the destination subscriber terminal;
   in response to the call request, providing at least one advertisement to a subscriber associated with the originating subscriber terminal;
   determining a free calling balance for the subscriber based on the destination identifier and based on providing the at least one advertisement to the subscriber;
   connecting the call from the originating subscriber terminal to the destination subscriber terminal; and
   monitoring the free calling balance as the call progresses, wherein the step of determining the free calling balance comprises (i) determining an advertisement time associated with the at least one advertisement being provided to the subscriber, (ii) determining a number of credits of free calling time based on the advertisement time, (iii) determining a zone measure between the originating subscriber terminal and the destination subscriber terminal, (iv) determining a free calling time based on the number of credits of free calling time and the zone measure.

2. A computer readable medium having stored therein instructions to execute the method of claim 1.

3. The method of claim 1, wherein determining the zone measure comprises:
   determining a distance between the originating subscriber terminal and the destination subscriber terminal; and
   determining the zone measure based on the distance between the originating subscriber terminal and the destination subscriber terminal.

4. The method of claim 1, further comprising:
   determining a discounted calling time for the subscriber based on the destination identifier and the at least one advertisement being provided to the subscriber; and
   connecting the call from the originating subscriber terminal to the destination subscriber terminal; and
   monitoring the discounted calling time as the call progresses.

5. The method of claim 1, further comprising:
   decrementing the free calling balance as the call progresses;
   determining if the free calling balance reaches a predetermined threshold level; and, if so,
   notifying the subscriber associated with the originating subscriber terminal.

6. The method of claim 5, wherein notifying the subscriber associated with the originating subscriber terminal when the free calling balance reaches the predetermined threshold level comprises:
    making a determination whether to provide additional advertisement to the subscriber; if so,
    providing the additional advertisement to the subscriber; and
    updating the free calling balance for the subscriber based on the additional advertisement being provided to the subscriber.

7. The method of claim 6, wherein determining whether to provide additional advertisement to the subscriber comprises querying the subscriber to obtain subscriber's instructions to provide the additional advertisement.

8. The method of claim 6, further comprising terminating the call when the free calling balance reaches a call termination threshold level.

9. The method of claim 1, wherein the destination identifier associated with the destination subscriber terminal is selected from a group consisting of (i) a Public Switch Telephone Network (PSTN) telephone number, (ii) a mobile identification number (MIN), (iii) an IP address, (iv) an ENUM, (v) a Network Access Identifier (NAI), and (vi) a domain name.

10. The method of claim 1, further comprising determining if the originating subscriber terminal is designated to receive advertisement services before providing the at least one advertisement to the subscriber associated with the originating subscriber terminal.

11. The method of claim 10, further comprising not providing the at least one advertisement to the subscriber associated with the originating subscriber terminal if the subscriber terminal is not designated to receive the advertisement services.

12. The method of claim 1, further comprising:
    querying a subscriber associated with the originating subscriber terminal to specify an expected length of the call to be connected from the originating subscriber terminal to the destination subscriber terminal; and
    providing the at least one advertisement based on the expected length of the call, wherein the at least one advertisement being provided to the subscriber is sufficient to connect the call for the specified length.

13. A method for advertising supported communications in a telecommunications network, the method comprising:
    receiving a call request to connect a call from an originating subscriber terminal to a destination subscriber terminal, the call request including a destination identifier associated with the destination subscriber terminal and further including a service code;
    in response to the call request, determining whether a subscriber associated with the originating subscriber terminal is designated to receive advertising supported services; if so,
    providing at least one advertisement to the subscriber;
    determining a free calling balance for the subscriber based on the destination identifier and based on providing the at least one advertisement to the subscriber;
    connecting the call from the originating subscriber terminal to the destination subscriber terminal;
    decrementing the free calling balance as the call progresses;
    disconnecting the call from the originating subscriber terminal to the destination subscriber terminal; and
    determining whether any unused free calling balance is left; and, if so, discarding the any unused free calling balance,
    wherein determining the free calling balance for the subscriber based on the destination identifier and based on providing the at least one advertisement to the subscriber comprises (i) determining an advertisement time associated with the at least one advertisement being provided to the subscriber, (ii) determining a number of credits of free calling time based on the advertisement time, (iii) determining a zone measure between the originating subscriber terminal and the destination subscriber terminal, (iv) determining a free calling time based on the number of credits of free calling time and the zone measure.

14. A computer readable medium having stored therein instructions to execute the method of claim 13.

15. The method of claim 13, wherein determining whether a subscriber associated with the originating subscriber terminal is designated to receive advertising supported services comprises determining whether the service code is an advertisement service code.

16. The method of claim 13, wherein determining whether a subscriber associated with the originating subscriber terminal is designated to receive advertising supported services comprises:
    retrieving a subscriber record associated with the subscriber of the originating subscriber terminal; and
    determining whether the subscriber record designates the subscriber to receive the advertising supported services.

17. The method of claim 13, wherein the destination identifier associated with the destination subscriber terminal is selected from a group consisting of (i) a Public Switched Telephone Network (PSTN) telephone number, (ii) a mobile identification number (MIN), (iii) an IP address, (iv) an ENUM, (v) a Network Access Identifier (NAI), and (vi) a domain name.

18. The method of claim 13, wherein providing at least one advertisement to the subscriber comprises playing the at least one advertisement to the subscriber.

19. The method of claim 13, wherein providing at least one advertisement to the subscriber comprises displaying the at least one advertisement to the subscriber via the originating subscriber terminal.

20. The method of claim 13, further comprising:
    determining a discounted calling time for the subscriber based on the destination identifier and the at least one advertisement being provided to the subscriber;
    connecting the call from the originating subscriber terminal to the destination subscriber terminal; and
    decrementing the discounted calling time as the call progresses.

21. The method of claim 13, further comprising:
    querying the subscriber associated with the originating subscriber terminal to specify an expected length of the call; and
    providing the at least one advertisement to the subscriber, wherein the at least one advertisement being provided to the subscriber is sufficient to connect the call for the specified length of the call.

22. A system for advertising-supported communications, the system comprising:
    a first network entity for receiving a call request to connect a call from an originating subscriber terminal to a destination subscriber terminal, the call request including a destination identifier associated with the destination subscriber terminal;

a second network entity for providing at least one advertisement to a subscriber associated with the originating subscriber terminal, in response to the call request; and a third network entity for determining a calling balance for the subscriber based on the destination identifier and based on providing the at least one advertisement to the subscriber and monitoring the calling balance when the call from the originating subscriber terminal is connected to the destination subscriber terminal, wherein the third network entity determines the calling balance by a process comprising (i) determining an advertisement time associated with the at least one advertisement being provided to the subscriber, (ii) determining a number of credits of free calling time based on the advertisement time, (iii) determining a zone measure between the originating subscriber terminal and the destination subscriber terminal, (iv) determining a free calling time based on the number of credits of free calling time and the zone measure.

23. The system of claim 22, wherein the calling balance comprises a free calling balance or a discounted calling time.

24. The system of claim 23, wherein the first network entity comprises a switch, the second network entity comprises a voice command platform, and a third network entity comprises a calculation engine.

25. The system of claim 23, further comprising, a fourth network entity determining if the originating subscriber terminal is designated to receive advertisement services before the second network entity providing the at least one advertisement to the subscriber associated with the originating subscriber entity.

26. The system of claim 25, wherein the fourth network entity comprises a service controller.

* * * * *